Patented Feb. 14, 1933

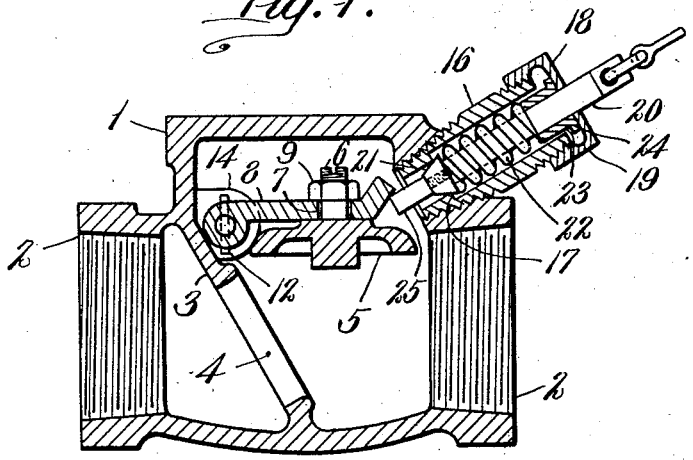
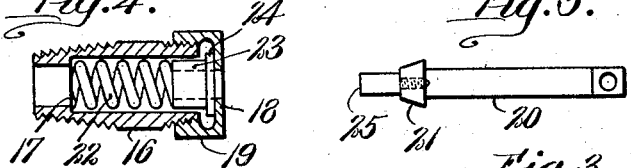
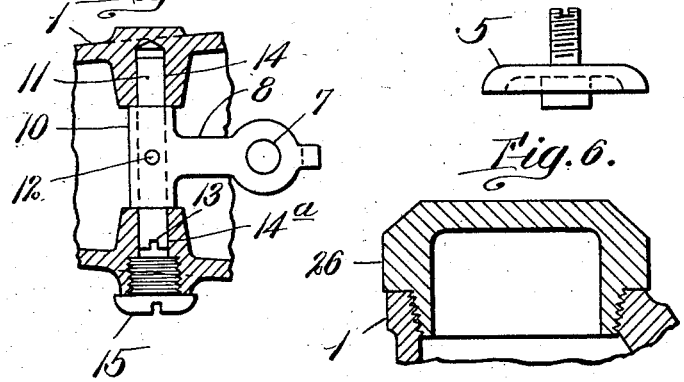

1,897,678

UNITED STATES PATENT OFFICE

HAROLD W. SCHIORRING, OF LEXINGTON, AND FRANCIS P. FUHS, OF BOSTON, MASSACHUSETTS

VALVE

Application filed September 19, 1931. Serial No. 563,688.

This invention relates to valves employed in connection with inflammable gases or liquids; its principal object being to provide means for automatically closing a valve, normally open, when it becomes heated beyond a certain temperature, as in case of fire, thereby stopping the flow of gas or liquid; a further object being to provide in addition for manually closing the valve when so desired.

The invention is illustrated by the accompanying drawing in which: Figure 1 is a central, vertical section of the valve; Fig. 2 is an elevation, partly in section of the swinging arm and its mounting; Fig. 3 is a detail elevation of the valve disc; Fig. 4 is an elevation, partly in section, of the spring and its mounting; Fig. 5 is a detail elevation of the fusible pin and its rod; and Fig. 6 shows a modified casing.

The valve casing 1 is threaded at each end 2 for instalment in a pipe line (not shown) and is furnished interiorly with the angularly disposed partition 3 furnished with the opening 4 and forming an annular seat for the valve disc 5, preferably weighty, and furnished centrally on its upper side with the slotted, threaded lug 6 which extends freely through the bore 7 in the outer end of swinging arm 8 and is held in free engagement therewith by nut 9; the inner end of the swinging arm 8 forming a sleeve 10 which is mounted on shaft 11 being affixed thereto by pin 12; said shaft 11 being furnished at one end with slot 13 and being rotatively mounted in bearings 14 and 14a in the wall of the casing, the bearing 14a including the screw cap 15 disposed in an opening in the wall of the casing opposite slot 13.

The tube 16 is projected from the casing, preferably approximately in alinement with the axis of valve disc 5, when seated, being furnished interiorly near its inner end with the annular shoulder 17, and exteriorly on its outer end with the nut 19 whose outer end is inwardly, annularly flanged at 18 to form a guide for the rod 20 extending therethrough into the tube, said rod being furnished at its inner end with the conical shoulder 21 which engages shoulder 17 of the tube and provides an abutment for the inner end of the helical spring 22 disposed in the tube, the outer end of which spring abuts on collar 23 encircling rod 20, the outer end of which collar is exteriorly flanged at 24 and abuts on the flanged outer end 18 of nut 19.

The fusible pin 25 is in threaded engagement with the inner conical end of rod 20 and engages the outer end of swinging arm 8 which it supports in its normal raised position (Fig. 1). The outer end of rod 20 affords a handle for drawing the rod outwardly sufficiently to withdraw the fusible pin from engagement with the swinging arm and permit the valve disc to seat itself.

The modification shown in Fig. 6 consists simply in furnishing the upper wall of the casing with an opening and closing that opening with cap 26.

The advantages of the present device are among others the following: The device is or may easily be adapted for use with a pipe line running horizontally, as shown, or vertically or in any other direction; the valve disc is seated by gravity alone and is not assisted therein by springs or other device; the fusible pin comes into contact with the valve disc mechanism at approximately a single point only and as it fuses does not clog the mechanism; the fusible pin is easily installed and, while held in operative position by spring 22, may be withdrawn manually from its supporting position by means of rod 20 extending through nut 19; the valve disc may be restored to its normal raised position by removing the screw cap 15 and rotating shaft 11 by engaging slot 13 with a screwdriver; the valve disc, as it is freely engaged by swinging arm 8, may adjust itself to its seat; the valve disc may be rotated by engaging slot 6 with any suitable instrument introduced through one end of the casing or through the top thereof or through tube 16 cleared for the purpose.

We claim—

1. In a valve of the character described, in combination, a valve casing adapted for instalment in a pipe line; a valve seat angularly disposed in the casing; a tube projected from the casing; a swinging arm disposed in the casing; a valve disc centrally freely engaged by the outer end of the swinging arm; a fusible pin supporting from below the outer end of the swinging arm in its raised position and extending into the tube; a spring controlled rod slidingly disposed in the tube, normally closing the inner entrance thereto, with its inner end affixed to the inner end of the fusible pin; and a rod controlling spring disposed in the tube.

2. In a valve of the character described, in combination, a valve casing; a valve seat disposed in the casing; a tube projected from the casing; a valve disc swingly disposed in the casing; a spring controlled rod slidingly disposed in the tube, normally closing the inner entrance thereto; a rod controlling spring disposed in the tube; and a fusible pin with its outer end supporting the swinging disc in its raised poistion and with its inner end extending into the tube and there fixedly engaging the inner end of the rod.

3. In a valve of the character described, in combination, a valve casing adapted for instalment in a pipe line; a valve seat angularly disposed in the casing; a tube projected from the casing; a swinging arm disposed in the casing; a valve disc centrally freely engaged by the outer end of the swinging arm; a fusible pin supporting from below the outer end of the swinging arm in its raised position and extending into the tube; a spring controlled rod slidingly disposed in the tube, normally closing the inner entrance thereto, with its inner end affixed to the end of the fusible pin and with its outer end extending through the outer end of the tube; and a rod controlling spring disposed in the tube.

4. In a valve of the character described, in combination, a valve casing; a valve seat disposed in the casing; a tube projected from the casing; a valve disc swingingly disposed in the casing; a spring controlled rod slidingly disposed in the tube, normally closing the inner entrance thereto, and extending through the outer end thereof; a rod controlling spring disposed in the tube; and a fusible pin with its outer end supporting the swinging disc in its raised position and with its inner end extending into the tube and there fixedly engaging the inner end of the rod.

HAROLD W. SCHIORRING.
FRANCIS P. FUHS.